(12) United States Patent
Okamoto et al.

(10) Patent No.: US 8,274,572 B2
(45) Date of Patent: Sep. 25, 2012

(54) ELECTRONIC CAMERA CAPTURING A GROUP OF A PLURALITY OF SPECIFIC OBJECTS

(75) Inventors: Masayoshi Okamoto, Osaka (JP); Masami Yasuda, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 518 days.

(21) Appl. No.: 12/355,028

(22) Filed: Jan. 16, 2009

(65) Prior Publication Data

US 2009/0185056 A1  Jul. 23, 2009

(30) Foreign Application Priority Data

Jan. 17, 2008  (JP) .................................. 2008-007561

(51) Int. Cl.
*H04N 5/225* (2006.01)

(52) U.S. Cl. ..................................................... 348/218.1

(58) Field of Classification Search ............... 348/218.1, 348/36, 155, 37
See application file for complete search history.

(56) References Cited

U.S. PATENT DOCUMENTS

| 6,215,519 B1 * | 4/2001 | Nayar et al. | 348/159 |
| 6,685,366 B1 * | 2/2004 | Corbin | 396/427 |
| 7,167,519 B2 * | 1/2007 | Comaniciu et al. | 375/240.08 |
| 7,292,261 B1 * | 11/2007 | Teo | 348/36 |
| 7,450,835 B2 * | 11/2008 | Lackey et al. | 396/58 |
| 2007/0115351 A1 * | 5/2007 | McCormack | 348/36 |

FOREIGN PATENT DOCUMENTS

| JP | 11-177878 A | 7/1999 |
| JP | 2003-016437 A | 1/2003 |
| JP | 2004-054928 A | 2/2004 |

OTHER PUBLICATIONS

Japanese Office Action issued Mar. 21, 2012 in corresponding Japanese Patent Application No. 2008-007561. English translation.

* cited by examiner

*Primary Examiner* — Jason Chan
*Assistant Examiner* — Gary C Vieaux
(74) *Attorney, Agent, or Firm* — Westerman, Hattori, Daniels & Adrian, LLP

(57) ABSTRACT

An electronic camera includes an imaging device. The imaging device has an imaging surface capturing an object scene and repeatedly outputs an object scene image. An orientation of the imaging surface is repeatedly changed by a CPU corresponding to a group photograph mode under which a group of a plurality of faces is captured. The CPU detects a face image from the object scene image outputted from the imaging device in association with a changing process of the orientation of the imaging surface. Furthermore, the CPU decides an angle range within which the group of a plurality of faces is contained based on a detection result of the face image. In addition, the CPU combines the plurality of object scene images outputted from the imaging device so as to create a combined image corresponding to the decided angle range. The created combined image is recorded in a recording medium.

11 Claims, 14 Drawing Sheets

ELECTRONIC CAMERA CAPTURING A GROUP OF A PLURALITY OF SPECIFIC OBJECTS

CROSS REFERENCE OF RELATED APPLICATION

The disclosure of Japanese Patent Application No. 2008-7561, which was filed on Jan. 17, 2008 is incorporated herein by reference.

BACKGROUND OF THE INVENTION

1. Field of the Invention

The present invention relates to an electronic camera. More particularly, the present invention relates to an electronic camera for creating, based on a plurality of images, a composite image having a size larger than a size of each image.

2. Description of the Related Art

According to one example of this type of camera, when generating one panorama by patching together a plurality of images, an object of a high cost is detected from an overlapped portion formed of adjacent two images. A cut edge is decided so as not to divide the detected object. However, in this camera, photographing a group of a plurality of specific objects is not assumed, and there is a limit to a quality (in particular, a quality regarding the size of an angle of view) of a combined image in which such objects are captured.

SUMMARY OF THE INVENTION

An electronic camera according to the present invention comprises: an imager having an imaging surface capturing an object scene, for repeatedly outputting an object scene image; a changer for repeatedly changing an orientation of the imaging surface corresponding to a specific mode under which a group of a plurality of specific objects is captured; a detector for detecting a specific object image from the object scene image outputted from the imager in association with the changing process of the changer; a decider for deciding an angle range within which the group of the plurality of specific objects is contained based on a detection result of the detector; and a creator for combining a plurality of object scene images outputted from the imager so as to create a combined image corresponding to the angle range decided by the decider.

Preferably, the changer includes a first changing processer for changing the orientation of the imaging surface toward one end in a designated direction and a second change processer for changing the orientation of the imaging surface toward the other end in the designated direction, and the decider includes a first deciding processor for referring to a specific object at one end in the designated direction out of the plurality of specific objects so as to decide one end of the angle range, and a second deciding processor for referring to a specific object at the other end in the designated direction out of the plurality of specific objects so as to decide the other end of the angle range.

In an aspect of the present invention, a distance from the one end of the angle range to the specific object at the one end in the designated direction and a distance from the other end of the angle range to the specific object at the other end in the designated direction are associate with a size of the specific object.

In another aspect of the present invention, the decider includes: a first distance calculator for calculating a distance from a specific object at one end in the designated direction, out of specific objects contained in a current angle of view of the imaging surface, to one end in the designated direction of the current angle of view of the imaging surface; a first stopper for stopping the first change processer when the distance detected by the first distance detector exceeds a threshold value; a second distance calculator for calculating a distance from a specific object at the other end in the designated direction, out of the specific objects contained in a current angle of view of the imaging surface, to the other end in the designated direction of the current angle of view of the imaging surface; and a second stopper for stopping the second change processer when the distance detected by the second distance detector exceeds the threshold value.

More preferably, the threshold value indicates a numerical value associated with a size of the specific object.

Preferably, the specific object is equivalent to a face portion of a human.

Preferably, the changer refers to a zoom factor to decide one change amount.

Preferably, each of the plurality of object scene images noticed by the creator has an overlapped image overlapped with another object scene image, and the creator includes a decider for deciding, as a combined portion, a portion different from the specific object image on the overlapped image, a cropper for cropping a partial image outside of the combined portion decided by the decider, and a combiner for using an object scene image left after a cropping process of the cropper so as to create the combined image.

Preferably, a first setter for setting a resolution of the object scene image outputted from the imager to a first resolution in association with the detection process of the detector; and a second setter for setting a resolution of the object scene image outputted from the imager to a second resolution higher than the first resolution in association with a creating process of the creator are further comprised.

Preferably, the changer starts the changing process in response to a remote control operation.

According to the present invention, an imaging control program executed by a processor of an electronic camera provided with an imager having an imaging surface capturing an object scene, for repeatedly outputting an object scene image, the image control program, comprises: a changing step of repeatedly changing an orientation of the imaging surface corresponding to a specific mode under which a group of a plurality of specific objects is captured; a detecting step of detecting a specific object image from the object scene image outputted from the imager in association with the changing process of the changing step; a deciding step of deciding an angle range within which the group of the plurality of specific objects is contained based on a detection result of the detecting step; and a creating step of combining a plurality of object scene images outputted from the imager so as to create a combined image corresponding to the angle range decided by the deciding step.

According to the present invention, an imaging control method executed by an electronic camera provided with an imager having an imaging surface capturing an object scene, for repeatedly outputting an object scene image, the image control method comprises: a changing step of repeatedly changing an orientation of the imaging surface corresponding to a specific mode under which a group of a plurality of specific objects is captured; a detecting step of detecting a specific object image from the object scene image outputted from the imager in association with the changing process of the changing step; a deciding step of deciding an angle range within which the group of the plurality of specific objects is contained based on a detection result of the detecting step;

and a creating step of combining a plurality of object scene images outputted from the imager so as to create a combined image corresponding to the angle range decided by the deciding step.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
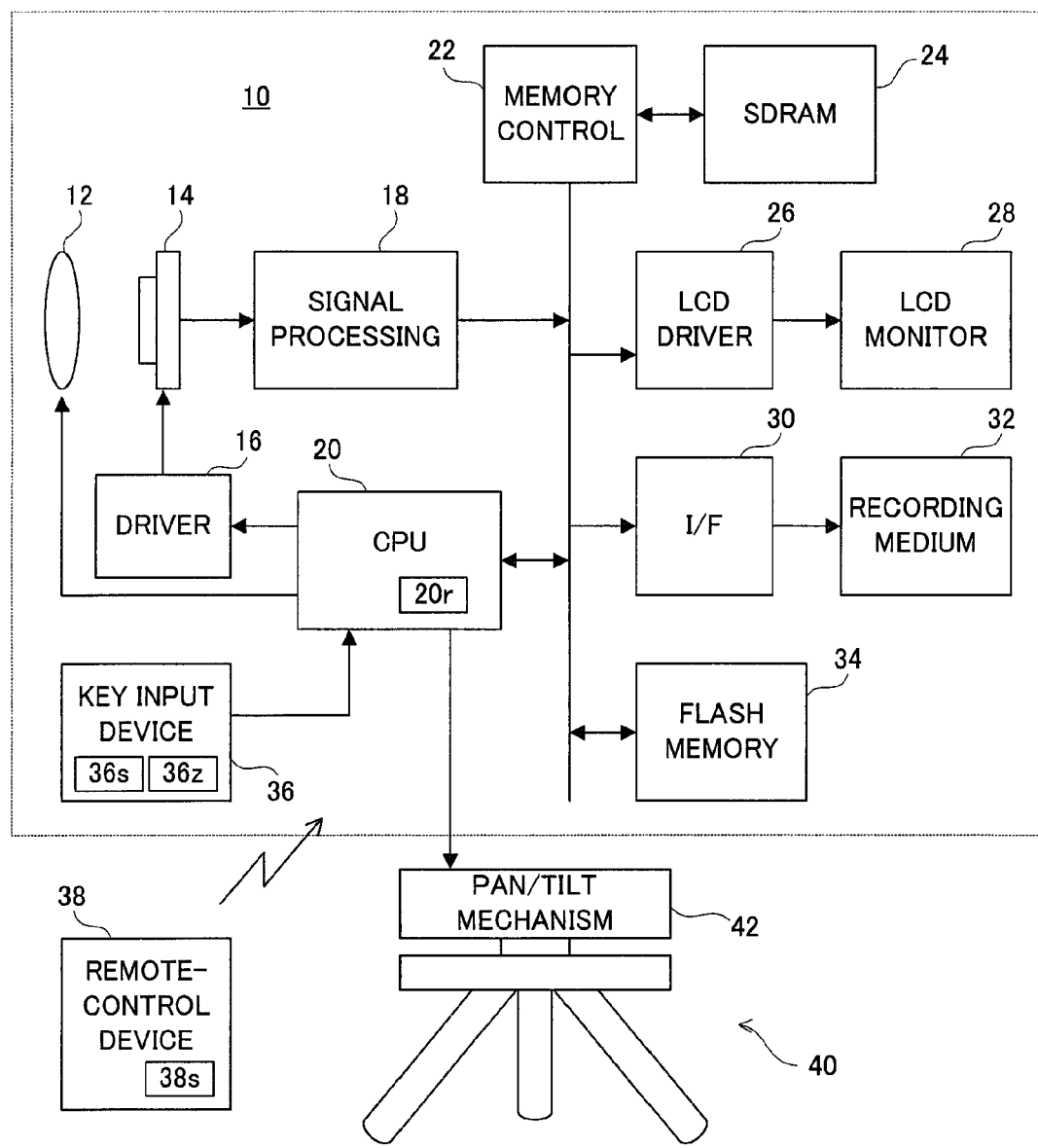
FIG. 1 is a block diagram showing a configuration of one embodiment of the present invention.

With reference to FIG. 1, a digital camera 10 of this embodiment is arranged on a tripod 40 having a pan/tilt mechanism 42. An optical image representing an object scene is irradiated onto an imaging surface of an imaging device 14 through a zoom lens 12. On the imaging surface, electric charges corresponding to the optical image are generated by photoelectric conversion.

When a power source is turned on, a through-image process is executed. In association with the through-image process, a CPU 20 instructs a driver 16 to repeat a pre-exposure operation and a thinning-out reading-out operation. In response to a cyclically occurring vertical synchronization signal Vsync, the driver 16 performs a pre-exposure on the imaging surface, and reads out the electric charges generated on the imaging surface in a thinning-out manner. Raw image data of a low resolution based on the read-out electric charges is cyclically outputted from the imaging device 14 in raster scanning manner.

Figure 2:
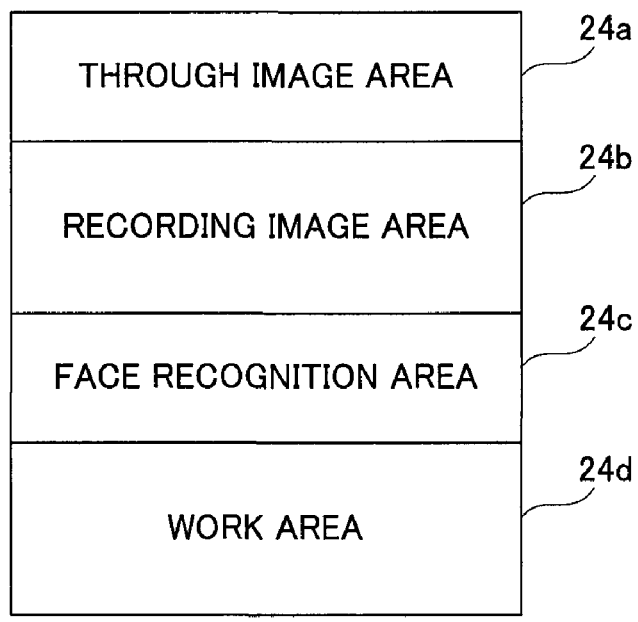
FIG. 2 is an illustrative view showing one example of a mapping state of an SDRAM applied to the embodiment in FIG. 1.

A signal processing circuit 18 performs processes, such as white balance adjustment, color separation, and YUV conversion, on the raw image data outputted from the imaging device 14, and writes YUV-formatted image data created thereby in a through-image area 24a (see FIG. 2) of an SDRAM 24 through a memory control circuit 22. An LCD driver 26 repeatedly reads out the image data accommodated in the through-image area 24a through the memory control circuit 22 so as to drive an LCD monitor 28 based on the read-out image data. As a result, a real-time moving image (through image) of the object scene is displayed on a monitor screen.

When a zoom button 36z on a key input device 36 is operated, the CPU 20 moves the zoom lens 12 in an optical axis direction. As a result, the magnification of the through image displayed on the monitor screen is changed.

When a shutter button 36s on a key input device 36 or a shutter button 38s on a remote control device 38 is operated in a state that a normal photographing mode is selected, a main photographing process and recording process are executed. The CPU 20 instructs the driver 16 to execute one main exposure operation and one all pixel reading in association with the main photographing process, and applies a recording instruction to an I/F 30 in association with the recording process.

The driver 16 performs a main exposure on the imaging surface in response to occurrence of a vertical synchronization signal Vsync, and reads out all the electric charges generated in an electric-charge reading-out area in a raster scanning manner. As a result, high-resolution raw image data representing an object scene is outputted from the imaging device 14. The outputted raw image data is converted into YUV-formatted image data by the signal processing circuit 18 similar to the case described above. The converted image data is written in a recording image area 24b of the SDRAM 24 by a memory control circuit 22. The I/F 30 reads out the high-resolution image data accommodated in the recording image area 24b through the memory control circuit 22, and records the read-out image data in a recording medium 32 in a file format. It is noted that the above-described through-image process is restarted at a time point when the main photographing process is completed.

Figure 3:
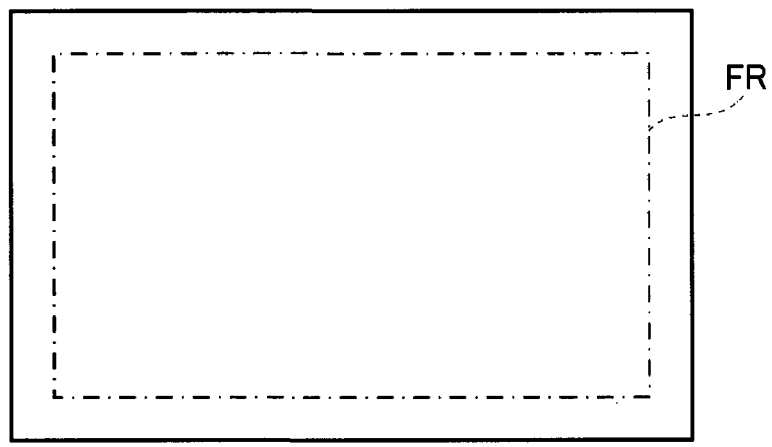
FIG. 3 is an illustrative view showing one example of an allocation state of a face recognition area in an imaging surface.
Figure 4:
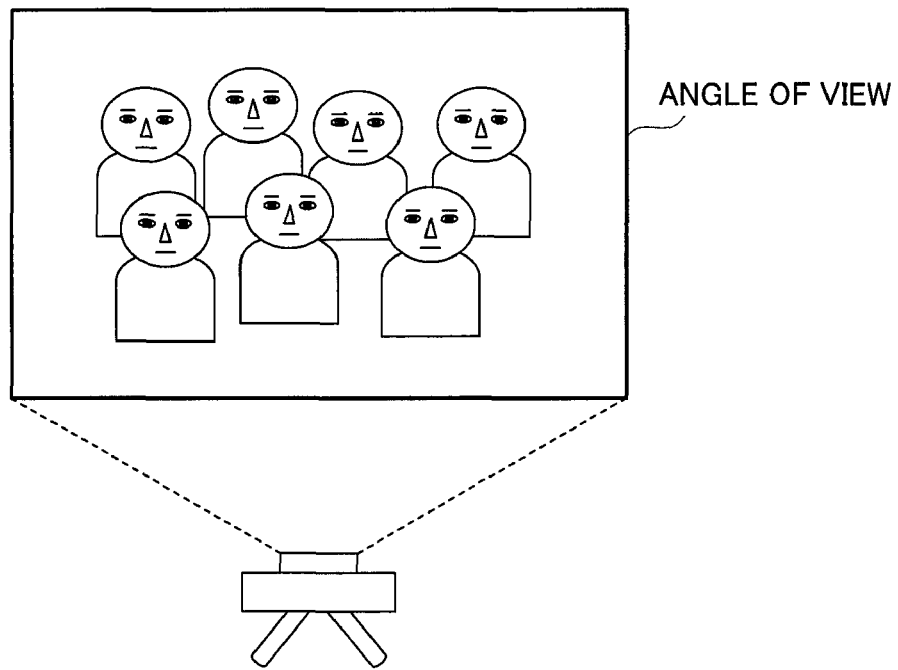
FIG. 4 is an illustrative view showing one example of an object scene photographed according to the embodiment in FIG. 1.
Figure 6:
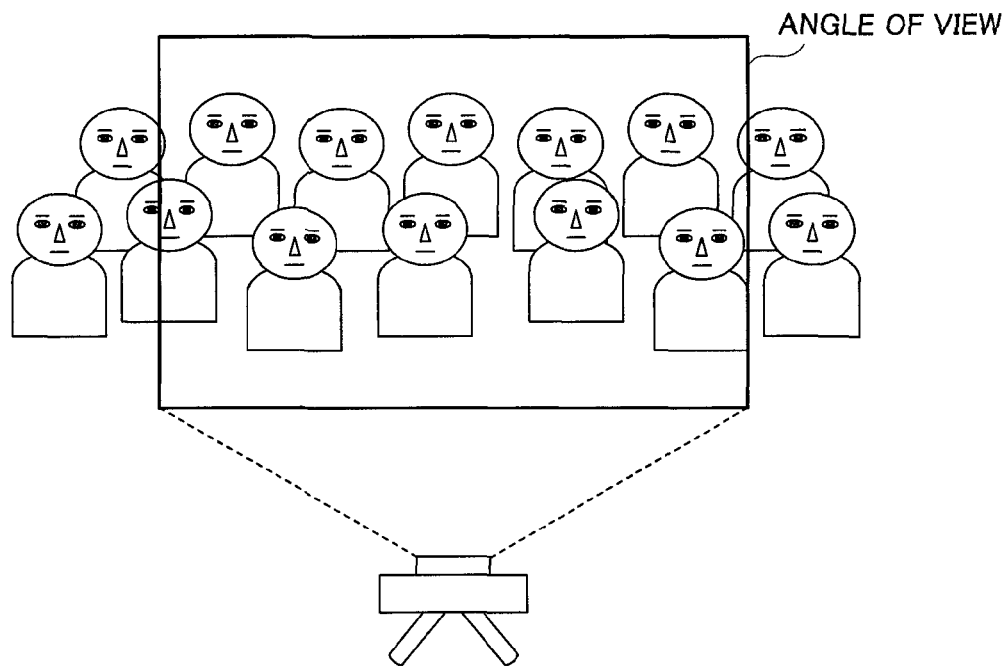
FIG. 6 is an illustrative view showing another example of the object scene photographed according to the embodiment in FIG. 1.

When a group of persons as shown in FIG. 4 or FIG. 6 is photographed, a group photograph mode is selected. When the shutter button 36s on the key input device 36 or the shutter button 38s on the remote control device 38 is operated under the group photograph mode, an image belonging to a face recognition area FR shown in FIG. 3 is subjected to a face recognition process for each partial image of a predetermined size.

More specifically, the latest 1-frame image is retreated to a face recognition area 24c from the through image area 24a, the partial images within the face recognition area FR are sequentially designated, and a feature amount of the designated partial image is checked against a feature amount, such as "eyes" "nose", "mouth", etc., prepared as dictionary data in a flash memory 34. When a matching level exceeds a threshold value, the designated partial image is regarded as an image representing a face of a person, and a size and central coordinates of a rectangular face frame enclosing this face image are registered in a register 20r as face frame information.

It is noted that the central coordinates of the face frame are expressed in an XY coordinate system in which a center of an object scene captured by the imaging surface at a time point when a group photograph mode is started is regarded as an origin, where a horizontal axis and a vertical axis are an X-axis and a Y-axis, respectively.

Next, a leftmost face frame and a rightmost face frame are detected from the register 20r, and an X-coordinate defining central coordinates of the leftmost face frame is set to a variable FCleft, and an X-coordinate defining central coordinates of the rightmost face frame is set to a variable FCright. Furthermore, a distance from an X-coordinate indicating a left end of an angle of view at a current time point to the X-coordinate indicated by the variable FCleft is set to a variable $\Delta L$, and a distance from an X-coordinate indicating a right end of an angle of view at a current time point to the X-coordinate indicated by the variable FCright is set to a variable $\Delta R$. In addition, an average value of horizontal sizes of the plurality of face frames registered in the register 20r is decided as a reference face size, and the decided reference face size is set to a variable Fsize.

Figure 5:
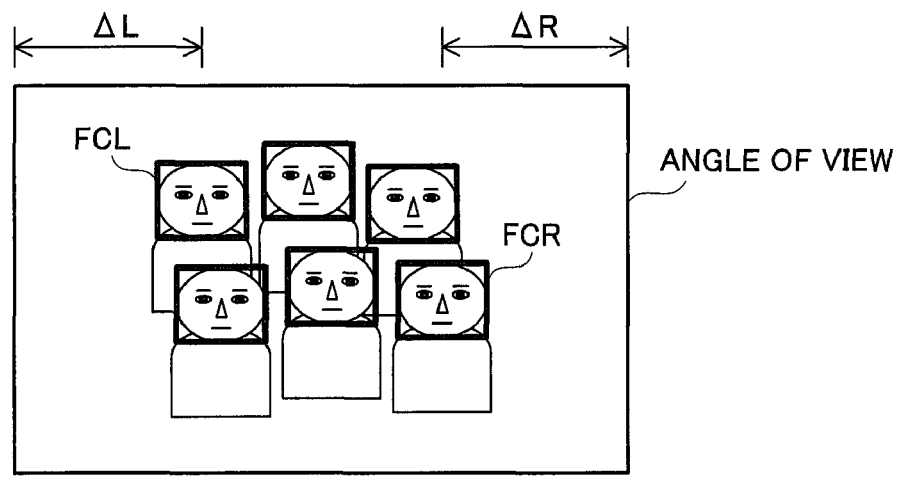
FIG. 5 is an illustrative view showing one portion of an operation of the embodiment in FIG. 1 when photographing the object scene shown in FIG. 4.

With respect to an object scene shown in FIG. 4, an X-coordinate of a center of a face frame FCL shown in FIG. 5 is set to the variable FCleft, and an X-coordinate of a center of a face frame FCR shown in FIG. 5 is set to the variable FCright. The variables $\Delta L$ and $\Delta R$ are defined according to a procedure shown in FIG. 5. The reference face size is an average value of the horizontal sizes of the plurality of face frames shown in FIG. 5.

Figure 7:
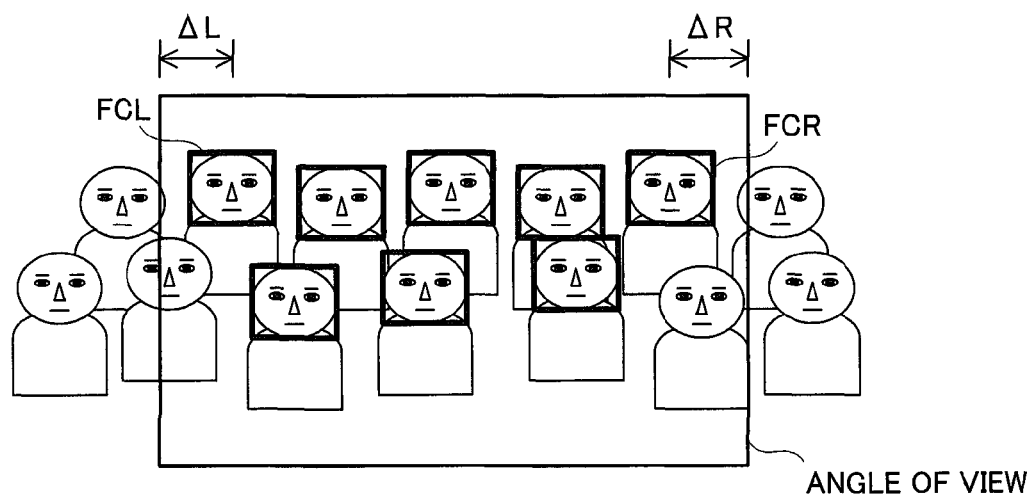
FIG. 7 is an illustrative view showing one portion of an operation of the embodiment in FIG. 1 when photographing the object scene shown in FIG. 6.

Furthermore, with respect to an object scene shown in FIG. 6, an X-coordinate of a center of a face frame FCL shown in FIG. 7 is set to the variable FCleft, and an X-coordinate of a center of a face frame FCR shown in the same figure is set to the variable FCright. The variables $\Delta L$ and $\Delta R$ are defined according to a procedure shown in FIG. 7. The reference face size is an average value of the horizontal sizes of the plurality of face frames shown in FIG. 7.

When the variables $\Delta L$, $\Delta R$, and Fsize are decided, it is determined whether or not next conditions 1 and 2 are satisfied.

$\Delta L > F\text{size}^*\alpha$ [Condition 1]

$\alpha$: constant (=2.0)

$\Delta R > F\text{size}^*\alpha$ [Condition 2]

With respect to the object scene shown in FIG. 4, any of these variables $\Delta L$ and $\Delta R$ is above $\alpha$ times the variable Fsize, i.e., both the conditions 1 and 2 are satisfied. In this case, the main photographing process and the recording process are rapidly executed, and high-resolution image data representing the object scene shown in FIG. 4 is recorded in the recording medium 32 in a file format.

With respect to the object scene shown in FIG. 6, any of these variables $\Delta L$ and $\Delta R$ is equal to or less than $\alpha$ times the variable Fsize. In this case, a pan angle at a current time point is firstly retreated in a variable Astart, an orientation of the imaging surface is rotated to the left by a predetermined amount by a pan/tilt mechanism 42, and after the rotation, the latest 1-frame image captured by the imaging surface is subjected to a face recognition process. The face frame information detected by this face recognition process is also registered in the register 20r. When a new face image is discovered, the variable FCleft is updated by the X-coordinate defining the central coordinates of the leftmost face frame on the screen. Furthermore, the variable $\Delta L$ is updated by a distance from the X-coordinate indicating the left end of the angle of view after the rotation to the X-coordinate indicated by the variable FCleft.

Figure 8:
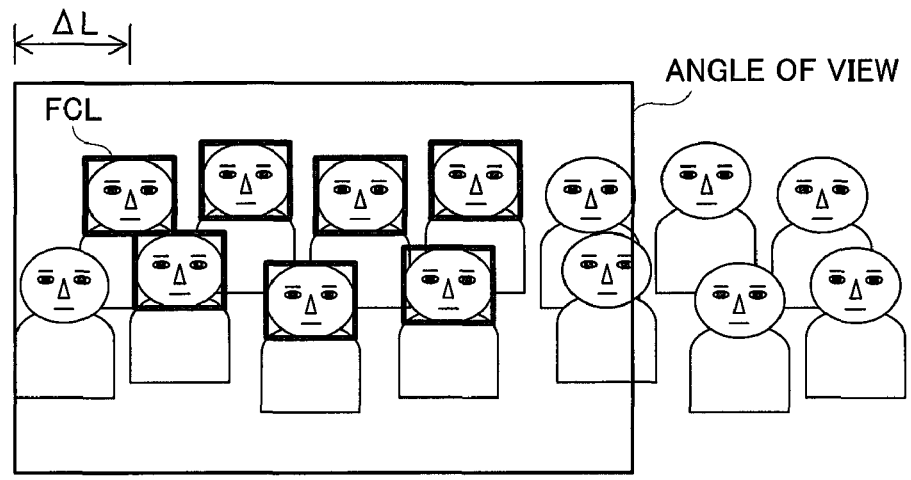
FIG. 8 is an illustrative view showing another portion of the operation of the embodiment in FIG. 1 when photographing the object scene shown in FIG. 6.
Figure 9:
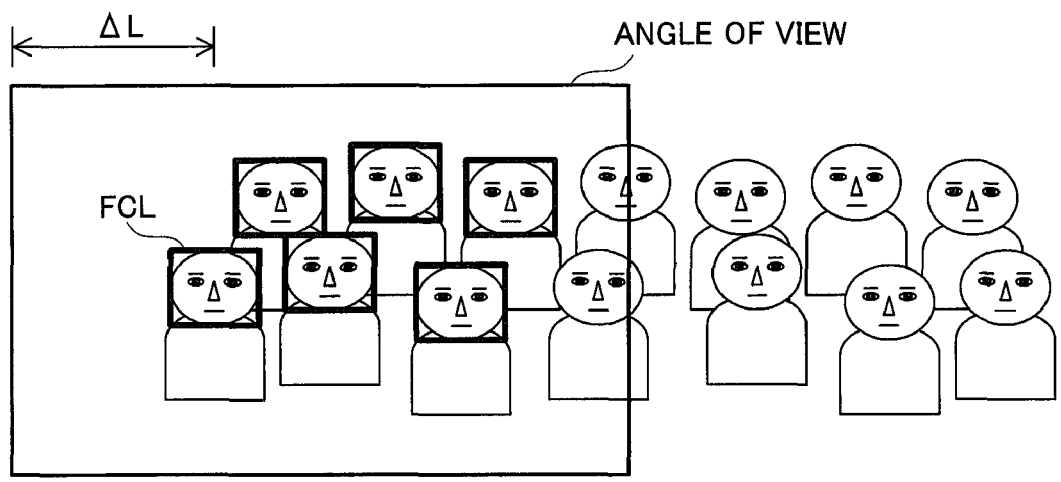
FIG. 9 is an illustrative view showing still another portion of the operation of the embodiment in FIG. 1 when photographing the object scene shown in FIG. 6.

The aforementioned process in which the orientation of the imaging surface is rotated to the left by a predetermined amount so as to calculate again the variable $\Delta L$ is repeatedly executed until the condition 1 is satisfied. Therefore, when photographing the object scene shown in FIG. 6, the angle of view is changed in procedures shown in FIG. 8 and FIG. 9. It is noted that a rotation amount of the orientation of the imaging surface is decided with reference to a zoom factor. That is, the rotation amount decreases as the zoom factor increases.

Figure 10:
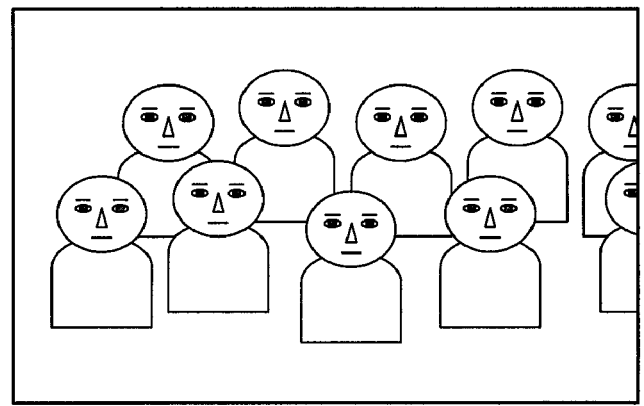
FIG. 10 is an illustrative view showing yet still another portion of the operation of the embodiment in FIG. 1 when photographing the object scene shown in FIG. 6.

When the condition 1 is satisfied, the orientation of the imaging surface is so adjusted that a distance from the X-coordinate indicating the left end of the angle of view to the X-coordinate indicated by the variable FCleft matches the reference face size, and an adjusted pan angle is set to a variable Aleft. Upon completion of setting of the variable Aleft, the main photographing process is executed. As a result of the main photographing process, high-resolution image data representing an object scene shown in FIG. 10 is retained in the recording image area 24b of the SDRAM 24.

Figure 11:
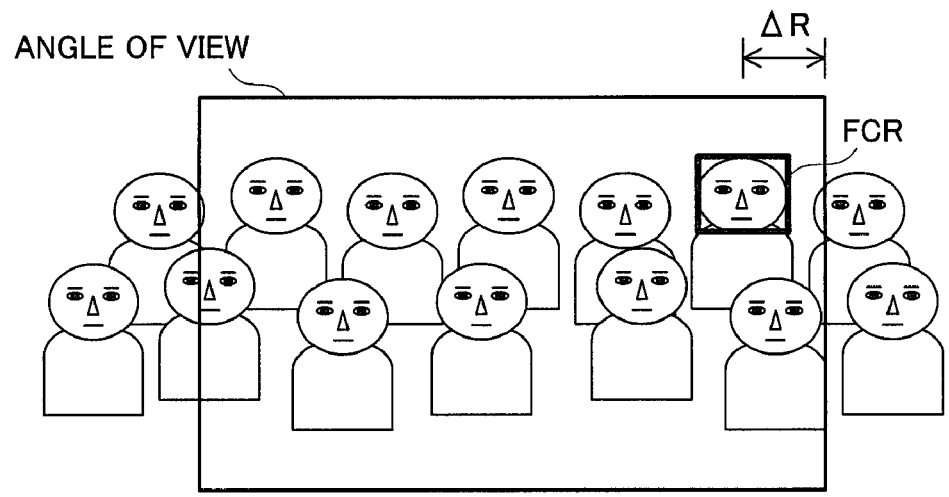
FIG. 11 is an illustrative view showing another portion of the operation of the embodiment in FIG. 1 when photographing the object scene shown in FIG. 6.

Upon completion of the main photographing process, the through-image process is restarted, and the orientation of the imaging surface is returned to a pan angle indicated by the variable Astart. The imaging surface captures an object scene by an angle of view shown in FIG. 11. However, since the above-described condition 2 is not satisfied, the orientation of the imaging surface is rotated to the right by a predetermined amount (=depending on the zoom factor). The latest 1-frame image captured by the imaging surface after the rotation is subjected to the face recognition process similar to the case described above, and the face frame information detected thereby is also registered in the register 20r. When a new face image is discovered, the variable FCright is updated by the X-coordinate defining the central coordinates of the rightmost face frame on the screen. Furthermore, the variable $\Delta R$ is updated by a distance from the X-coordinate indicating the right end of the angle of view after the rotation to the X-coordinate indicated by the variable FCright.

Figure 12:
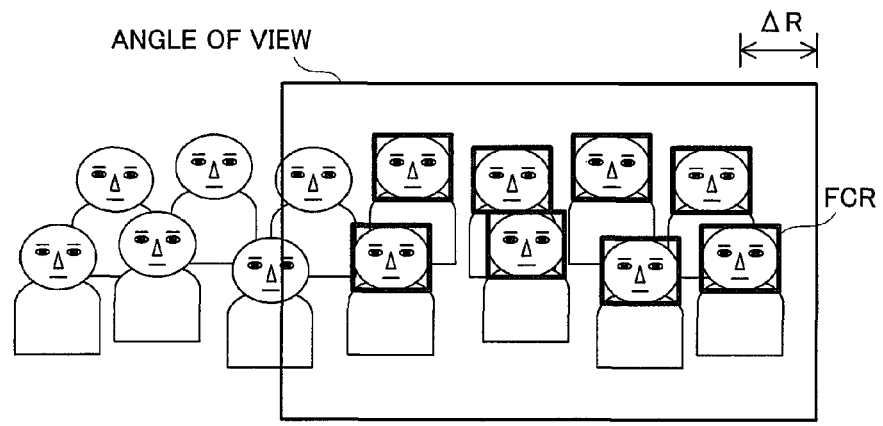
FIG. 12 is an illustrative view showing still another portion of the operation of the embodiment in FIG. 1 when photographing the object scene shown in FIG. 6.
Figure 13:
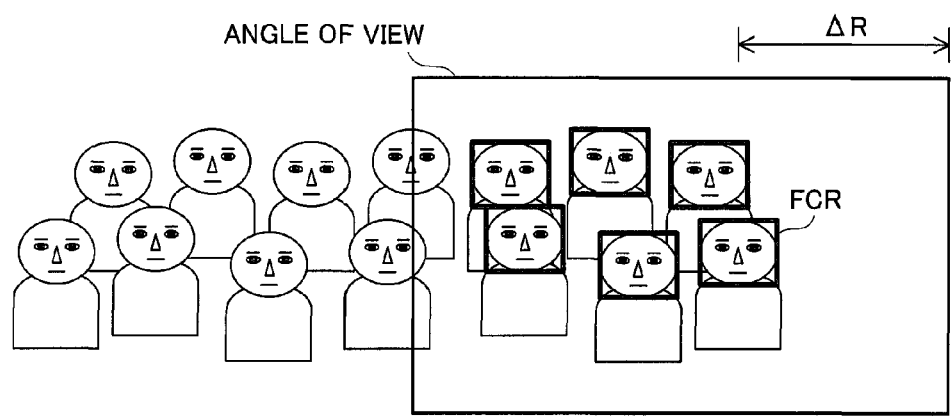
FIG. 13 is an illustrative view showing yet still another portion of the operation of the embodiment in FIG. 1 when photographing the object scene shown in FIG. 6.

The above-described process in which the orientation of the imaging surface is rotated to the right by a predetermined amount so as to calculate again the variable $\Delta R$ is repeatedly executed until the condition 2 is satisfied. Therefore, the angle of view is changed according to procedures shown in FIG. 12 and FIG. 13.

Figure 14:
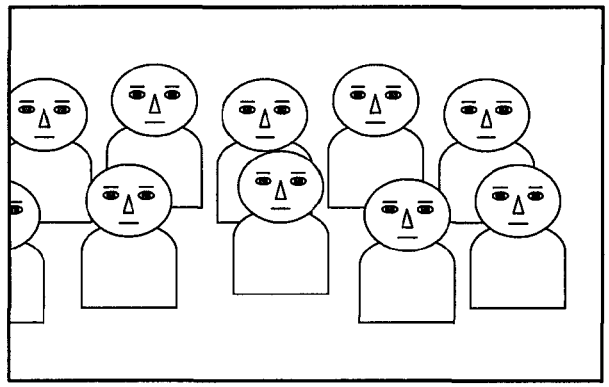
FIG. 14 is an illustrative view showing another portion of the operation of the embodiment in FIG. 1 when photographing the object scene shown in FIG. 6.

When the condition 2 is satisfied, the orientation of the imaging surface is so adjusted that the distance from the X-coordinate indicating the right end of the angle of view to the X-coordinate indicated by the variable FCright matches the reference face size, and an adjusted pan angle is set to a variable Aright. Upon completion of setting of the variable Aright, the main photographing process is executed. As a result of the main photographing process, high-resolution image data representing an object scene shown in FIG. 14 is retained in the recording image area 24b of the SDRAM 24.

Subsequently, a difference absolute value between the variables Aleft and Aright is compared with a threshold value TH in a procedure in a condition 3 in order to determine whether or not the two frames of the object scene image retained in the recording image area 24b have an overlapped image with a sufficient horizontal width.

$$|Aleft-Aright|<H \quad \text{[Condition 3]}$$

It is noted that the threshold value TH also indicates a numerical value different depending on the zoom factor. That is, the numerical value indicated by the threshold value TH decreases as the zoom factor increases.

Unless the condition 3 is satisfied, one or more pan angles in which an overlapped image with a sufficient horizontal width is retained in the adjacent two frames of the object scene images are decided, the orientation of the imaging surface is set to the decided pan angle, and the main photographing process is executed. The high-resolution image data obtained by this main photographing process is also retained in the recording image area 24b of the SDRAM 24.

The two or more frames of image data thus obtained are moved to the work area 24d, and the following processes are performed therein. Firstly, from each frame of the object scene image, the overlapped image overlapped with another object scene image is specified, and a partial image different from the face image is detected from the overlapped image. Furthermore, the detected partial image is regarded as a "margin", and the overlapped image outside of the "margin" is regarded as an unnecessary image. When two frames of the object scene images as shown in FIG. 10 and FIG. 14 are obtained, the overlapped image, the "margin", and the unnecessary image are specified according to a procedure shown in FIG. 15.

Figure 16:
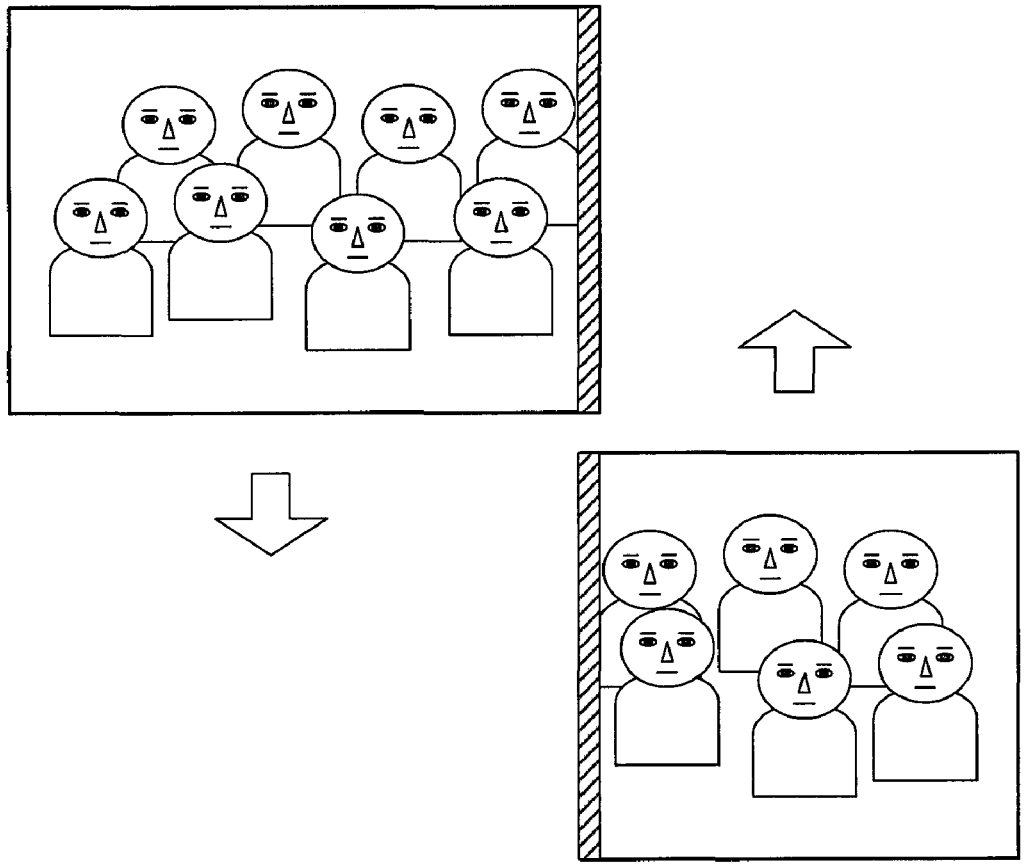
FIG. 16 is an illustrative view showing yet still another portion of the operation of the embodiment in FIG. 1 when photographing the object scene shown in FIG. 6.
Figure 17:
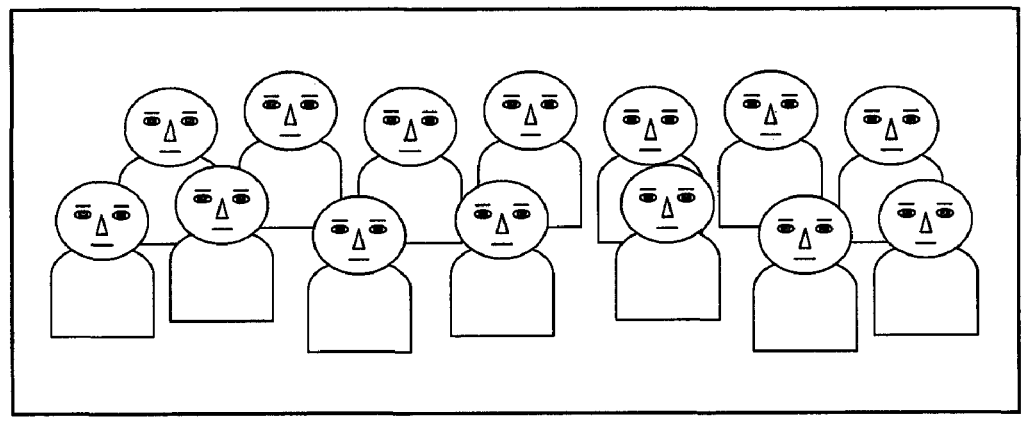
FIG. 17 is an illustrative view showing another portion of the operation of the embodiment in FIG. 1 when photographing the object scene shown in FIG. 6.

The unnecessary image is cropped from each frame of the object scene image, and the object scene image remaining thereafter is subjected to an image combining process. That is, a plurality of object scene images from which unnecessary parts are removed are combined to each other along portions of the "margin" as shown in FIG. 16, and image data representing the combined image completed thereby is returned from the work area 24d to the recording image area 24b. Upon completion of the image combining process, the image data returned to the recording image area 24b is subjected to a recording process. As a result, a file containing the image data of the combined image shown in FIG. 17 is recorded in the recording medium 32.

When the group photograph mode is selected, the CPU 20 executes a process according to a flowchart shown in FIG. 18 to FIG. 21. It is noted that a control program corresponding to this flow chart is stored in the flash memory 34.

Figure 18:
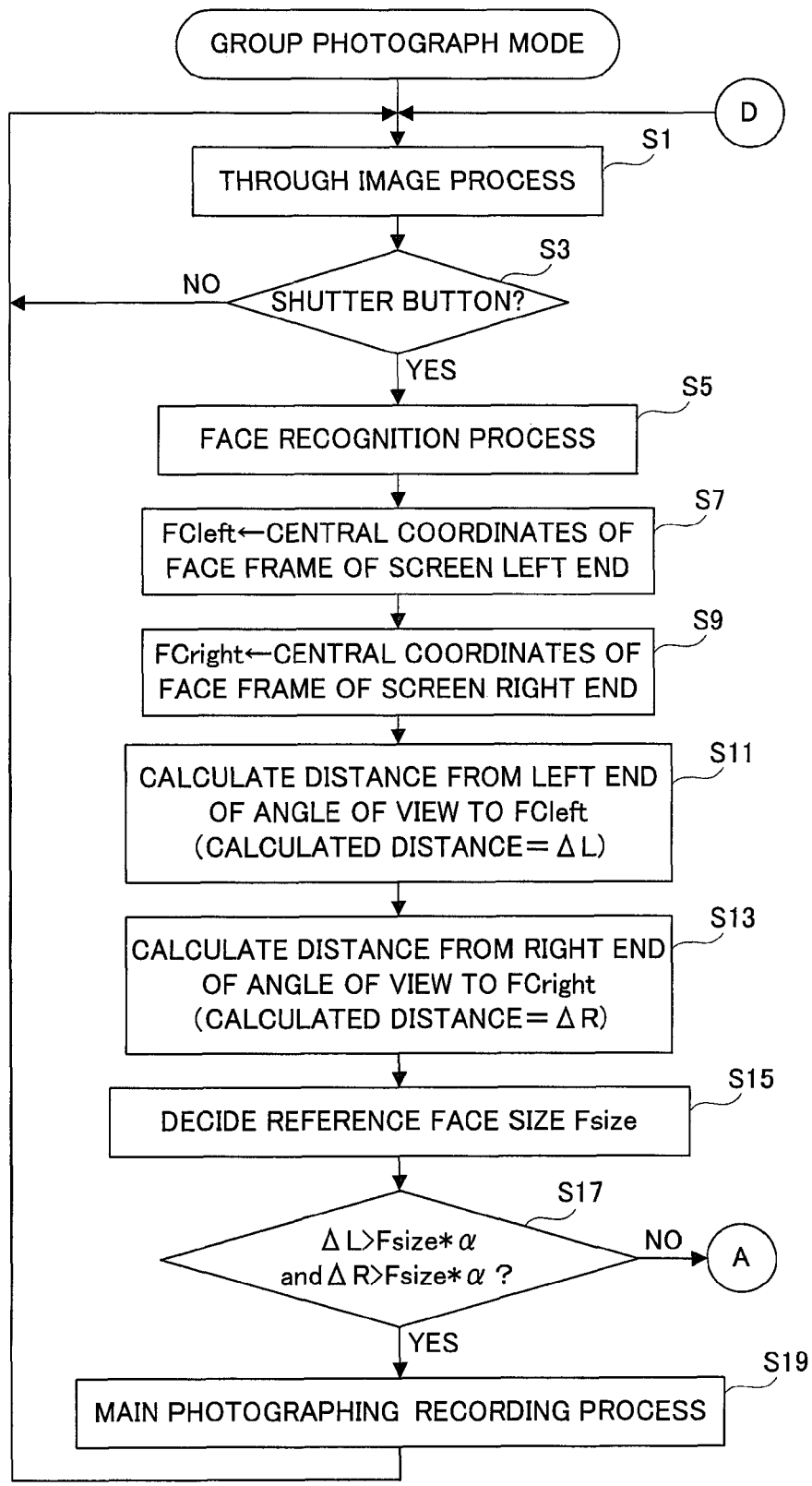
FIG. 18 is a flowchart showing one portion of an operation of a CPU applied to the embodiment in FIG. 1.
Figure 19:
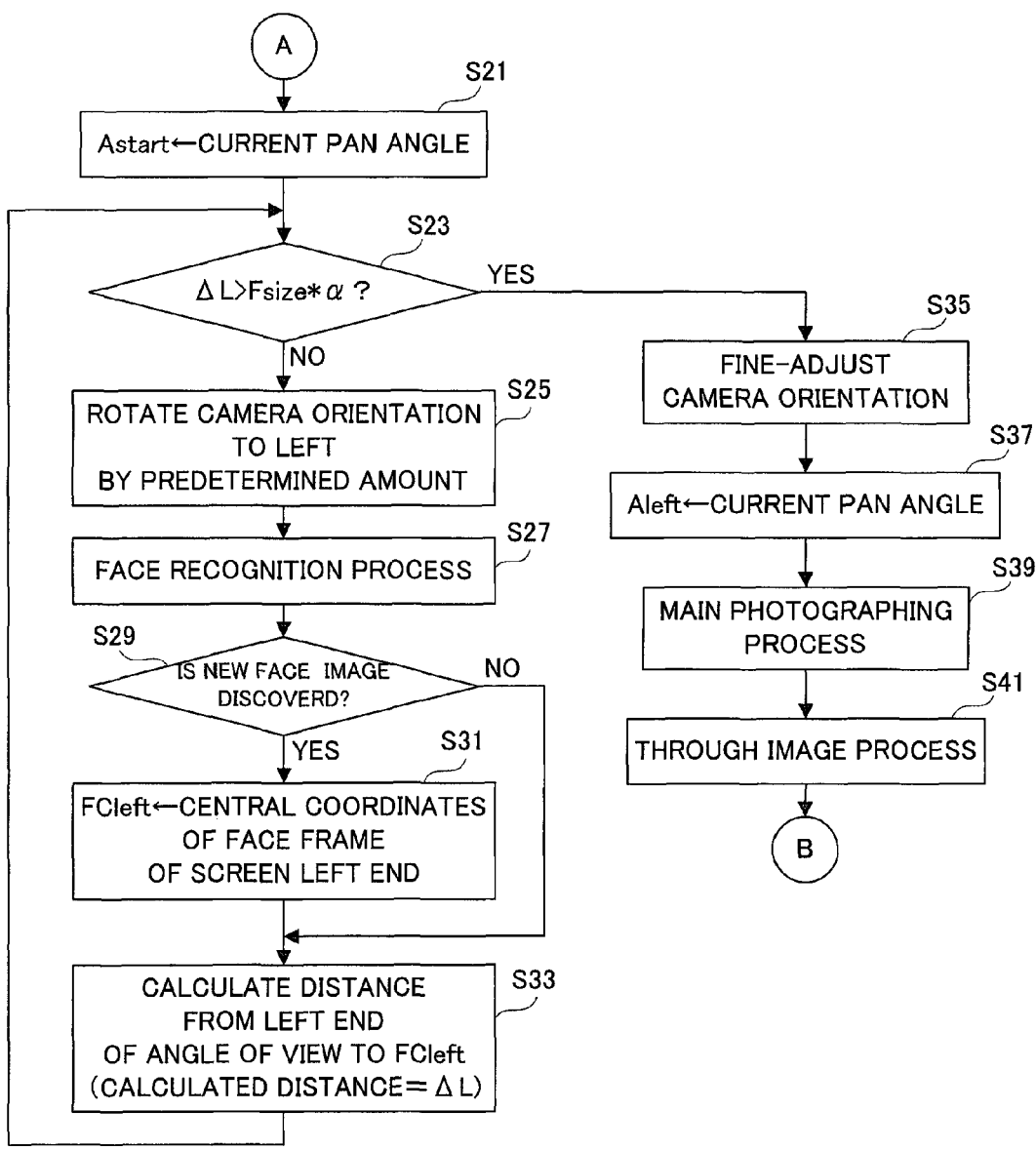
FIG. 19 is a flowchart showing another portion of the operation of the CPU applied to the embodiment in FIG. 1.
Figure 20:
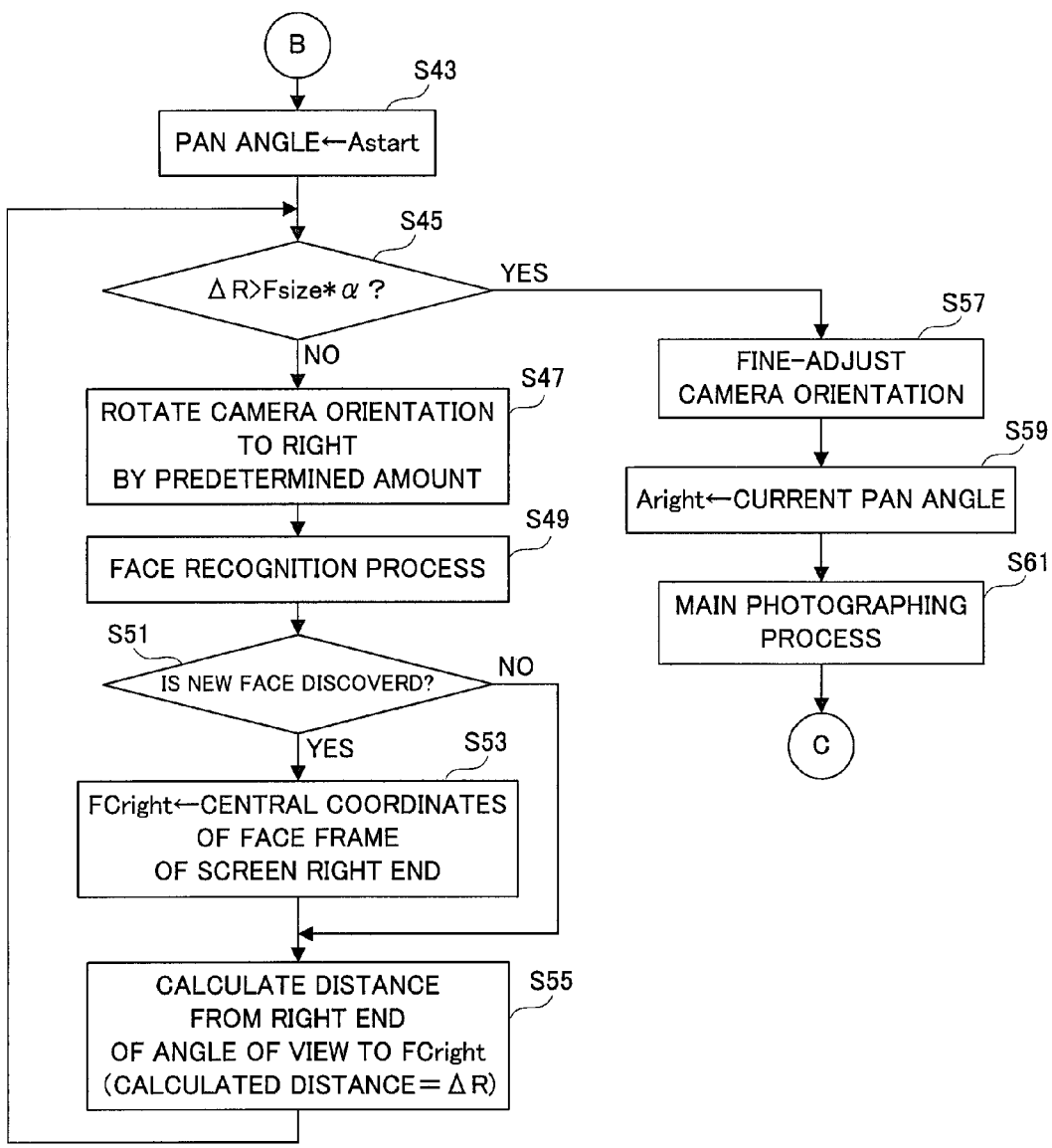
FIG. 20 is a flowchart showing still another portion of the operation of the CPU applied to the embodiment in FIG. 1.
Figure 21:
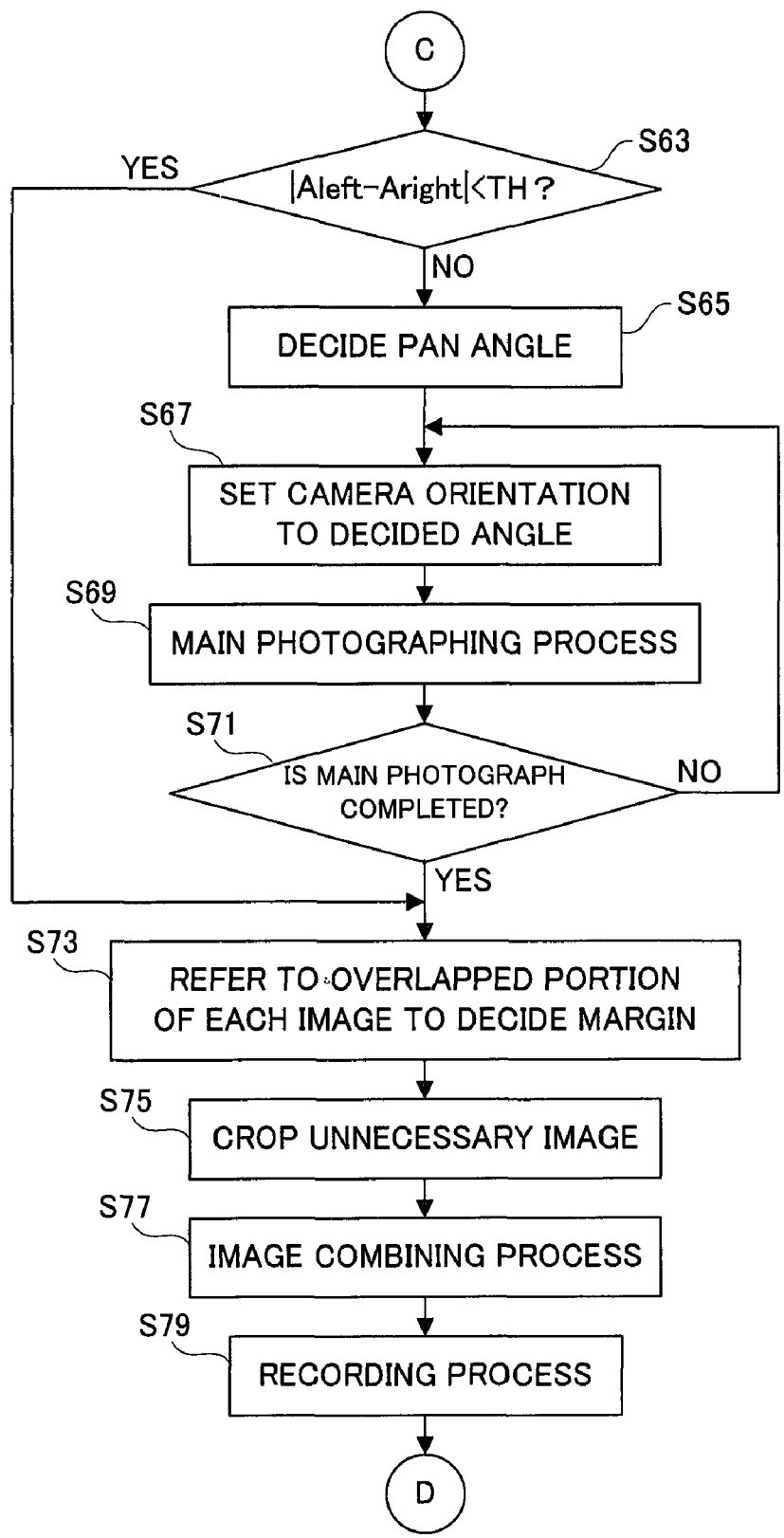
FIG. 21 is a flowchart showing yet still another portion of the operation of the CPU applied to the embodiment in FIG. 1.

In a step S1 shown in FIG. 18, the through-image process is firstly executed. As a result, a through image representing an object scene is displayed on the LCD monitor 28. When the shutter button 36s or 38s is operated, YES is determined in a step S3, and the face recognition process is executed in a step S5. As a result, the size and the central coordinates of the face frame covering the recognized face image are registered as face frame information in the register 20r.

In a step S7, a leftmost face frame is detected from the register 20r, and an X-coordinate defining the central coordinates of the detected face frame is set to the variable FCleft. In a step S9, a rightmost face frame is detected from the register 20r, and an X-coordinate defining the central coordinates of the detected face frame is set to the variable FCright.

In a step S11, a distance from the left end of the angle of view at a current time point to the variable FCleft is calculated, and the calculated distance is set to the variable ΔL. In a step S13, a distance from the right end of the angle of view at a current time point to the variable FCright is calculated, and the calculated distance is set to the variable ΔR. In a step S15, a reference face size is decided based on the horizontal size of the face frame registered in the register 20r. The decided reference face size is set to the variable Fsize.

In a step S17, it is determined whether or not both the condition 1 and the condition 2 are satisfied, and when YES is determined, the main photographing process and the recording process are executed in a step S19. Thereby, high-resolution image data representing the object scene captured at a current time point is recorded in the recording medium 32 in a file format. The through-image process in the step S1 is restarted after the process in the step S19.

When NO is determined in the step S17, i.e., unless at least one of the condition 1 and the condition 2 is satisfied, the process proceeds to processes after the step S21. In the step S21, a pan angle at a current time point is set to the variable Astart, and in a step S23, it is determined whether or not the condition 1 is satisfied. When NO is determined in this step, the pan/tilt mechanism 42 is utilized to rotate the orientation of the imaging surface to the left by a predetermined amount in a step S25, and a face recognition process similar to that in the step S5 is executed in a step S27. The face frame information (size, central coordinates) obtained thereby is registered in the register 20r.

In a step S29, it is determined whether or not a new face image is discovered based on the face frame information registered in the register 20r. When NO is determined in this step, the process directly proceeds to a step S33 while when YES is determined, the variable FCleft is updated with an X-coordinate of the newly discovered face image, and then, the process proceeds to the step S33. In the step S33, a process similar to that in the step S11 is executed. The variable ΔL is updated by the distance calculated thereby. When the variable ΔL is updated, the process returns to the step S23.

When YES is determined in the step S23, the process proceeds to a step S35 to adjust the orientation of the imaging surface so that the distance from the left end of the angle of view to the central coordinates of the leftmost face image matches the reference face size. In a step S37, a current pan angle is set to the variable Aleft, and in a succeeding step S39, a main photographing process is executed. As a result of the main photographing process, high-resolution image data is retained in the recording image area 24b of the SDRAM 24. Upon completion of the main photographing process, the through image is restarted in a step S41, and the process proceeds to a step S43.

Processes in steps S43 to S61 are the same as those in the above-described processes in the steps S21 to S39 except that: whether or not the condition 2 is satisfied is determined in the step S45; the orientation of the imaging surface is rotated to the right by a predetermined amount in the step S47; the variable FCright is updated by an X-coordinate of a newly discovered face image in the step S53; the distance from the right end of the angle of view to the variable FCright is calculated as ΔR in a step S55; the orientation of the imaging surface is so adjusted that the distance from the right end of the angle of view to the central coordinates of the rightmost face image matches the reference face size in the step S57; and the current pan angle is set to the variable Aright in the step S59. Thus, the duplicated description is omitted.

In a step S63, it is determined whether or not the condition 3 is satisfied. When YES is determined in this step, the process directly proceeds to a step S73 while when NO is determined, the process undergoes the processes of steps S65 to S71, and then proceeds to the step S73.

In the step S65, one or more pan angles at which an overlapped image having a sufficient horizontal width is retained in the adjacent two frames of the object scene image are decided. In the step S67, the orientation of the imaging surface is set to any one of the pan angles decided in the step S65, and in the step S69, the main photographing process is executed. In the step S71, it is determined whether or not the main photographing processes at all the decided pan angles are completed, and when YES is determined, the process proceeds to a step S73 while when NO is determined, the process returns to the step S67. Additionally, in the second or subsequent processes in the step S67, the orientation of the imaging surface is set to one of the remaining pan angles.

In the step S73, two or more frames of image data obtained by the main photographing process are moved to the work area 24d from the recording image area 24b, an overlapped image is specified from the two or more frames of image data, and a "margin" is further decided on the specified overlapped image. In a step S75, a partial image outside of the decided "margin" is cropped as an unnecessary image. In a step S77, a plurality of frames of image data from which the unnecessary image is removed are combined with each other so as to create combined image data, and the created combined image data is sent back to the recording image area 24b. In a step S79, the combined image data on the recording image area 24b is recorded in the recording medium 32 in a file format, and thereafter, the process returns to the step S1.

As understood from the above description, the imaging device 14 has an imaging surface capturing an object scene, and repeatedly outputs the object scene image. The orientation of the imaging surface is repeatedly changed by the CPU 20 corresponding to the group photograph mode (specific mode) capturing a group of a plurality of faces (specific objects) (S25 and S47). The CPU 20 detects a face image (specific object image) from the object scene image outputted from the imaging device 14 in association with a changing process of the orientation of the imaging surface (S27 and S49). The CPU 20 further decides an angle range within which the group of a plurality of faces is contained based on the detection result of the face image (S23, S29 to S37, S45, and S51 to S59). The CPU 20 further combines the plurality of object scene images outputted from the imaging device 14, and creates the combined image corresponding to the decided angle range (S73, S75, and S77).

Thus, when the group photograph mode is selected, the orientation of the imaging surface is repeatedly changed. The angle range within which the group of a plurality of faces is contained is decided based on the detection result of the face image obtained in association with the changing process of the orientation of the imaging surface. As a result, it becomes possible to preferentially create the combined image in which the group of a plurality of faces is contained.

It is noted that in this embodiment, the shutter button 38s on the remote control device 38 is arranged to thereby cause an operator also to enter the object scene. However, instead of this, a so-called self-timer photographing function may be arranged.

Figure 15:
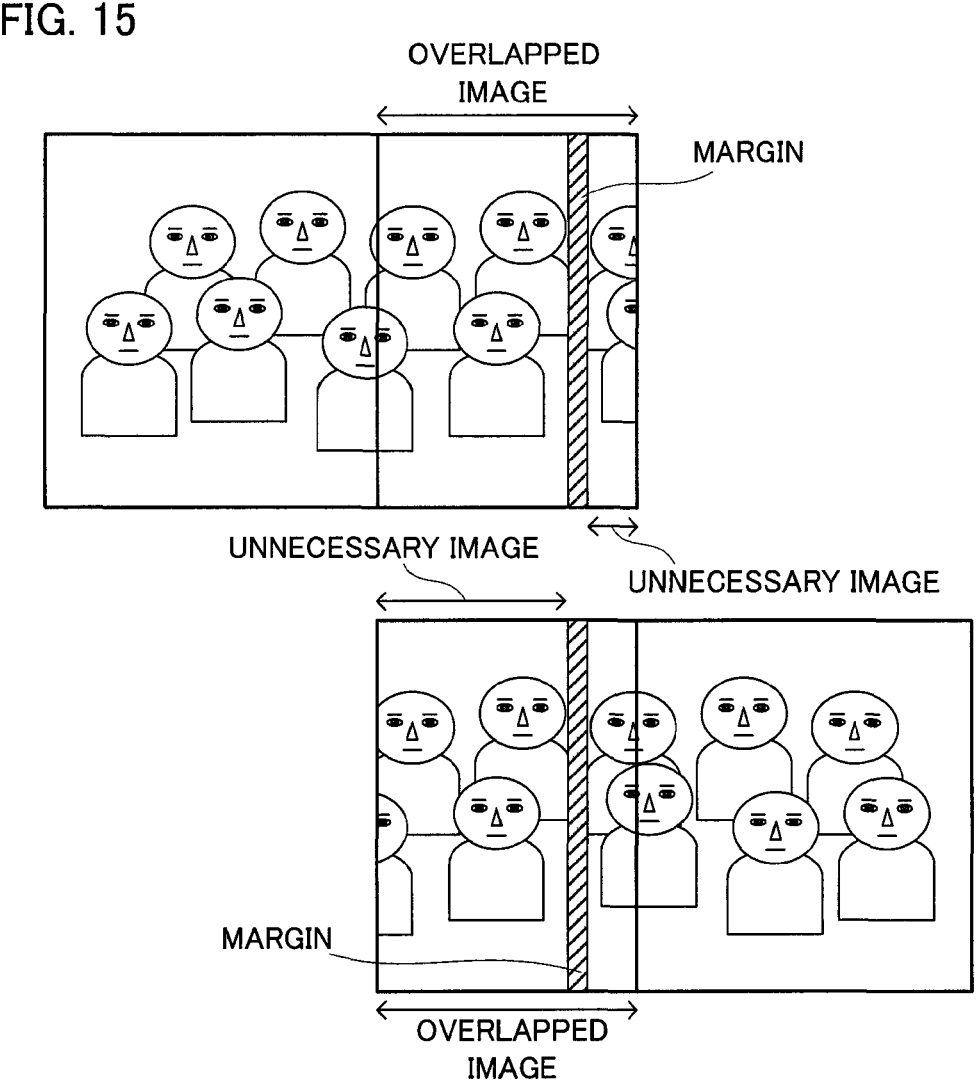
FIG. 15 is an illustrative view showing still another portion of the operation of the embodiment in FIG. 1 when photographing the object scene shown in FIG. 6.

Furthermore, in this embodiment, the "margin" is formed in a band shape linearly extending in a vertical direction (see FIG. 15). However, the "margin" may be formed in a non-linear band shape.

Figure 22:
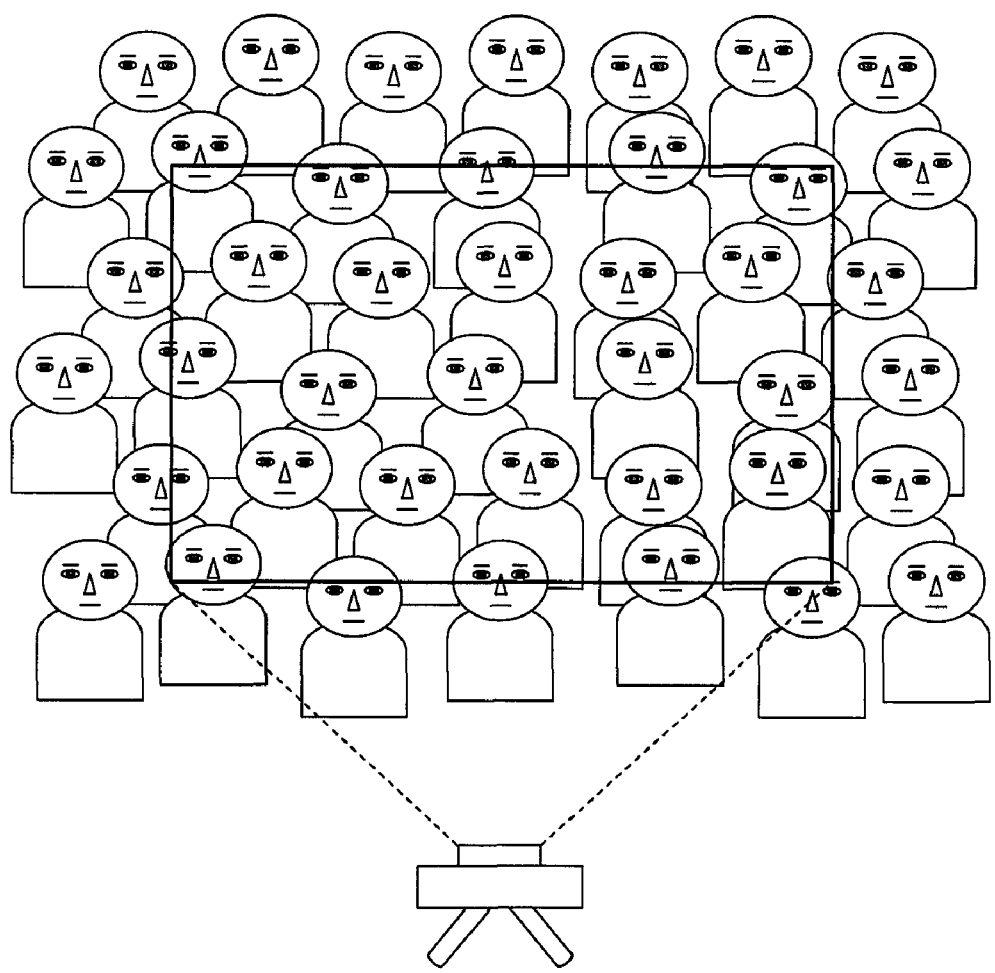
FIG. 22 is an illustrative view showing one example of an object scene photographed in another embodiment.

In addition, in this embodiment, the orientation of the imaging surface is changed in the horizontal direction only. However, in a case that a group of persons sticks out also in the vertical direction of the angle of view as shown in FIG. 22, it is necessary to change the orientation of the imaging surface in both the horizontal and vertical directions.

Furthermore, in this embodiment, after completion of the main photographing processes at the left end and the right end, the main photographing process is executed near the center, where necessary. However, in parallel with the panning from the left end to the right end, the horizontal width of the overlapped image is repeatedly forecasted, and the main photographing process may be executed at a timing at which the horizontal width becomes insufficient.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera provided with a processing unit to execute a computer program, which is supported by a supporting device having a pan/tilt rotation mechanism, comprising:

an imager having an imaging surface capturing a scene, which repeatedly outputs an image representing the scene;

a changer as a part of the computer program, which repeatedly changes a pan angle and/or a tilt angle by controlling said supporting device when a group photograph mode is selected;

a detector as a part of the computer program, which detects a specific object image from the image outputted from said imager in association with the changing process of said changer;

a decider as a part of the computer program, which decides a plurality of angles defining a range which contains a group of specific objects each of the specific objects is equivalent to the specific object image detected by said detector, based on a detection result of said detector; and a creator as a part of the computer program, which combines a plurality of images outputted from said imager so as to create a combined image corresponding to the range defined by the plurality of angles decided by said decider, wherein said changer includes a first changing processor which changes the pan angle and/or the tilt angle toward a first designated direction and a second change processor which changes the pan angle and/or the tilt angle toward a second designated direction opposite to the first designated direction, and said decider includes a first deciding processor which refers to a first specific object existing at an end in the first designated direction out of the plurality of specific objects so as to decide one of the plurality of angles, and a second deciding processor which refers to a second specific object existing at an end in the second designated direction out of the plurality of specific objects so as to decide another of the plurality of angles.

2. An electronic camera according to claim 1, wherein a distance from the one of the plurality of angles to the first specific object is associated with a size of the first specific object, and a distance from the other of the plurality of angles to the second specific object is associated with a size of the second specific object.

3. An electronic camera according to claim 1, wherein said decider includes:
- a first distance calculator which calculates a distance from a specific object at one end in the first designated direction, out of specific objects contained in a current angle of view of the imaging surface, to one end in the first designated direction of the current angle of view of the imaging surface;
- a first stopper which stops said first change processor when the distance detected by said first distance detector exceeds a threshold value;
- a second distance calculator which calculates a distance from a specific object at one end in the second designated direction, out of the specific objects contained in a current angle of view of the imaging surface, to one end in the second designated direction of the current angle of view of the imaging surface; and
- a second stopper which stops said second change processor when the distance detected by said second distance detector exceeds the threshold value.

4. An electronic camera according to claim 3, wherein the threshold value indicates a numerical value associated with a size of the specific object.

5. An electronic camera according to claim 1, wherein said specific object is equivalent to a face portion of a human.

6. An electronic camera according to claim 1, wherein said changer refers to a zoom factor to decide one change amount.

7. An electronic camera according to claim 1, wherein said changer starts the changing process in response to a remote control operation.

8. An electronic camera provided with a processing unit to execute a computer program, which is supported by a supporting device having a pan/tilt rotation mechanism, comprising:
- an imager having an imaging surface capturing a scene, which repeatedly outputs an image representing the scene;
- a changer as a part of the computer program, which repeatedly changes a pan angle and/or a tilt angle by controlling said supporting device when a group photograph mode is selected;
- a detector as a part of the computer program, which detects a specific object image from the image outputted from said imager in association with the changing process of said changer;
- a decider as a part of the computer program, which decides a plurality of angles defining a range which contains a group of specific objects each of the specific objects is equivalent to the specific object image detected by said detector, based on a detection result of said detector; and
- a creator as a part of the computer program, which combines a plurality of images outputted from said imager so as to create a combined image corresponding to the range defined by the plurality of angles decided by said decider,
- wherein each of the plurality of images noticed by said creator has an overlapped image overlapped with another image, and said creator includes a decider which decides, as a combined portion, a portion different from the specific object image on the overlapped image, a cropper which crops a partial image outside of the combined portion decided by said decider, and a combiner which uses an image left after a cropping process of said cropper so as to create the combined image.

9. An electronic camera provided with a processing unit to execute a computer program, which is supported by a supporting device having a pan/tilt rotation mechanism, comprising:
- an imager having an imaging surface capturing a scene, which repeatedly outputs an image representing the scene;
- a changer as a part of the computer program, which repeatedly changes a pan angle and/or a tilt angle by controlling said supporting device when a group photograph mode is selected;
- a detector as a part of the computer program, which detects a specific object image from the image outputted from said imager in association with the changing process of said changer;
- a decider as a part of the computer program, which decides a plurality of angles defining a range which contains a group of specific objects each of the specific objects is equivalent to the specific object image detected by said detector, based on a detection result of said detector; and
- a creator as a part of the computer program, which combines a plurality of images outputted from said imager so as to create a combined image corresponding to the range defined by the plurality of angles decided by said decider, and said electronic camera further comprising:
- a first setter as a part of the computer program, which sets a resolution of the image outputted from said imager to a first resolution in association with the detection process of said detector; and
- a second setter as a part of the computer program, which sets a resolution of the image outputted from said imager to a second resolution higher than the first resolution in association with a creating process of said creator.

10. A computer program embodied in a non-transitory tangible medium, which is executed by a processor of an electronic camera provided with an imager having an imaging surface capturing a scene, which repeatedly outputs an image representing the scene, and supported by a supporting device having a pan/tilt rotation mechanism, said program, comprising:
- a changing step of repeatedly changing a pan angle and/or a tilt angle by controlling said supporting device when a group photograph mode is selected;
- a detecting step of detecting a specific object image from the object scene image outputted from said imager in association with the changing process of said changing step;
- a deciding step of deciding a plurality of angles defining a range which contains a group of specific objects each of the specific objects is equivalent to the specific object image detected by said detecting step, based on a detection result of said detecting step; and
- a creating step of combining a plurality of images outputted from said imager so as to create a combined image corresponding to the range defined by the plurality of angles decided by said deciding step, wherein said changing step includes a first changing step of changing the pan angle and/or the tilt angle toward a first designated direction and a second changing step of changing the pan angle and/or the tilt angle toward a second designated direction opposite to the first designated direction, and said deciding step includes a first deciding step of referring to a first specific object existing at an end in the first designated direction out of the plurality of specific objects so as to decide one of the plurality of angles, and a second deciding step of referring to a second specific object existing at an end in the second designated direction out of the plurality of specific objects so as to decide another of the plurality of angles.

11. An imaging control method executed by an electronic camera provided with an imager having an imaging surface capturing a scene, which repeatedly outputs an image representing the scene, and supported by a supporting device having a pan/tilt rotation mechanism, the imaging control method, comprising:

a changing step of repeatedly changing a pan angle and/or a tilt angle by controlling said supporting device when a group photograph mode is selected;

a detecting step of detecting a specific object image from the image outputted from said imager in association with the changing process of said changing step;

a deciding step of deciding a plurality of angles defining a range which contains a group of specific objects each of the specific objects is equivalent to the specific object image detected by said detecting step, based on a detection result of said detecting step; and a creating step of combining a plurality of images outputted from said imager so as to create a combined image corresponding to the range defined by the plurality of angles decided by said deciding step, wherein said changing step includes a first changing step of changing the pan angle and/or the tilt angle toward a first designated direction and a second changing step of changing the pan angle and/or the tilt angle toward a second designated direction opposite to the first designated direction, and said deciding step includes a first deciding step of referring to a first specific object existing at an end in the first designated direction out of the plurality of specific objects so as to decide one of the plurality of angles, and a second deciding step of referring to a second specific object existing at an end in the second designated direction out of the plurality of specific objects so as to decide another of the plurality of angles.

* * * * *